(12) United States Patent
Voss

(10) Patent No.: US 11,801,738 B2
(45) Date of Patent: Oct. 31, 2023

(54) PANEL JOINING ARRANGEMENT FOR A VEHICLE CANOPY

(71) Applicant: ROCK SOLID INDUSTRIES INTERNATIONAL (PTY) LTD, Pietermaritzburgh (CA)

(72) Inventor: Michael Voss, Aledo, TX (US)

(73) Assignee: Rock Solid Industries International (Pty) Ltd, Pietermaritzburgh (ZA)

( * ) Notice: Subject to any disclaimer, the term of this patent is extended or adjusted under 35 U.S.C. 154(b) by 0 days.

(21) Appl. No.: 17/856,276

(22) Filed: Jul. 1, 2022

(65) Prior Publication Data

US 2022/0332176 A1 Oct. 20, 2022

Related U.S. Application Data

(63) Continuation of application No. 17/091,114, filed on Nov. 6, 2020, now Pat. No. 11,376,937.

(30) Foreign Application Priority Data

Nov. 6, 2019 (ZA) .................................. 2019/07353

(51) Int. Cl.
*B60J 7/16* (2006.01)
*B60J 7/14* (2006.01)
*B60J 7/11* (2006.01)

(52) U.S. Cl.
CPC ............... *B60J 7/1607* (2013.01); *B60J 7/11* (2013.01); *B60J 7/141* (2013.01)

(58) Field of Classification Search
CPC ....... B60J 7/10; B60J 7/106; B60J 7/14; B60J 7/141; B60J 7/1607; B62D 25/02; B62D 25/06

(Continued)

(56) References Cited

U.S. PATENT DOCUMENTS

| 4,733,902 A | 3/1988 | Rabb |
| 2003/0085586 A1 | 5/2003 | Kiousis |

(Continued)

FOREIGN PATENT DOCUMENTS

| FR | 2937592 A1 | 4/2010 |
| GB | 2304647 A | 3/1997 |
| WO | 2016/042494 A1 | 3/2016 |

OTHER PUBLICATIONS

International Search Report for PCT/IB2015/057124 (ISA/EP) dated Dec. 16, 2015 (3 pages).

(Continued)

*Primary Examiner* — Jason S Daniels
(74) *Attorney, Agent, or Firm* — Nolan R. Hubbard; K&L Gates LLP

(57) ABSTRACT

The invention relates to a panel joining arrangement for a vehicle canopy. The vehicle canopy includes at least one three panel join where a side panel, roof panel and end panel of the vehicle canopy meet. The panel joining arrangement comprises first and second lip portions formed in the side panel of the vehicle canopy and a third lip portion formed in the roof panel. The first and second lip portions are longitudinally offset and transversely overlapping in relation to a length of the side panel. The third lip portion is configured to mate with the second lip portion at the three panel join of the vehicle canopy such that the third lip portion is located adjacent to and substantially flush with the first lip portion.

21 Claims, 11 Drawing Sheets

(58) Field of Classification Search
USPC ........................................ 296/100.02, 100.04
See application file for complete search history.

(56) References Cited

U.S. PATENT DOCUMENTS

2003/0085593 A1* 5/2003 Shuto .................... B62D 25/02
296/203.01
2008/0067830 A1 3/2008 Frankham

OTHER PUBLICATIONS

U.S. Appl. No. 29/681,188, filed Feb. 22, 2019 entitled Canopy for a Vehicle, Truck, or the Like.
U.S. Appl. No. 29/707,698, filed Sep. 30, 2019 entitled Canopy for a Vehicle, Truck, Light Delivery Vehicle or Similar Vehicle.
U.S. Appl. No. 29/707,699, filed Sep. 30, 2019 entitled Canopy for a Vehicle, Truck, Light Delivery Vehicle or Similar Vehicle.
U.S. Appl. No. 29/707,700, filed Sep. 30, 2019 entitled Canopy for a Vehicle, Truck, Light Delivery Vehicle or Similar Vehicle.
U.S. Appl. No. 29/707,702, filed Sep. 30, 2019 entitled Front Panel with an Integrated Upper Window for a Vehicle Canopy.
U.S. Appl. No. 29/728,568, filed Mar. 19, 2020 entitled Panel with an Integrated Upper Window for a Vehicle Canopy or the Like.
U.S. Appl. No. 29/724,879, filed Feb. 20, 2020 entitled Canopy for a Vehicle, Truck, Light Delivery Vehicle or Similar Vehicle.
U.S. Appl. No. 29/738,788, filed Jun. 19, 2020 entitled Canopy for a Vehicle, Truck, Lizht Delivery Vehicle or Similar Vehicle.
U.S. Appl. No. 29/681,185, filed 20-22-2019 entitled Modular Flat Deck, Skirtinz, and Canopy for a Vehicle, Truck, or the Like.
U.S. Appl. No. 29/681,255, filed Feb. 22, 2019 entitled Canopy for a Vehicle, Truck, or the Like and Components and Accessories Related Thereto.
U.S. Appl. No. 16/744,596, filed Jan. 16, 2020 entitled Fastening Device.
U.S. Appl. No. 16/906,399, filed Jun. 19, 2020 entitled Air Vent.
U.S. Appl. No. 17/091,114, filed Nov. 6, 2020 entitled Pane/Joining Arrangement for a Vehicle Canopy.

* cited by examiner

PANEL JOINING ARRANGEMENT FOR A VEHICLE CANOPY

CROSS-REFERENCE TO RELATED APPLICATION

This application is a continuation of U.S. patent application Ser. No. 17/091,114 filed Nov. 6, 2020 which claims the benefit of South African Patent Application No. 2019/07353, filed Nov. 6, 2019, the entire contents of which are incorporated by reference herein.

FIELD OF THE INVENTION

The invention relates, generally, to vehicle canopies and to kits for assembling vehicle canopies. More specifically, the invention relates to a panel joining arrangement for such a kit or vehicle canopy.

BACKGROUND TO THE INVENTION

For purposes of interpreting this specification, the term "canopy" or "vehicle canopy" refers to a cover for a load bin of a vehicle such as a "bakkie", as they are generally known in South Africa, or a utility vehicle or pick-up truck, as they are generally known elsewhere in the world.

The Applicant previously developed a flat pack kit for a canopy. The kit includes a roof panel, side panels and one or more end panels (e.g. a front panel and a rear panel). The panels are specifically shaped, dimensioned and configured to be flat packed and assembled and the kit can thus be distributed as a complete knock-down (CKD). The basic concept of the kit is described in Patent Cooperation Treaty (PCT) patent application No. PCT/IB2015/057124, published as WO/2016/042494 on 24 Mar. 2016, which is incorporated by reference herein.

The Applicant's kit has been commercially successful. The Applicant believes that the success of the kit can be attributed at least in part to its knock-down construction and robust features. A number of different ranges, variations and modifications have been introduced over the years to expand on and enhance the Applicant's product offering.

However, designing a CKD which, when assembled and installed, satisfactorily seals off the interior of the canopy has remained a challenge. Small spaces or gaps between adjacent parts of the assembled canopy allow for the passage of water, dust and/or other unwanted particles into the interior of the canopy.

Referring specifically to water leaks, the Applicant has found that the corner zones where the roof panel meets with respective side and end/junction panels are prone to water leakage. In the context of this specification, the term "three panel corner join" or simply "three panel join" is used to refer to the zone where a roof panel meets with a side and end panel (or other similar panel). The canopy typically includes a roof panel, two opposing side panels, a front panel and a rear panel, in which case the canopy therefore defines four three panel joins.

By way of example, FIGS. 1 to 4 illustrate gaps formed at the three panel joins of two of the Applicant's known canopies.

FIGS. 1 and 2 show a gap 102 in a first canopy. The first canopy is shown in a partially assembled condition, with a roof panel 104 in the process of being connected to a side panel 106. The gap 102 is formed as a result of the roof panel 104 not abutting the side panel 106 at the three panel join 116. More specifically, an outer surface 108 of a lip 110 of the roof panel 104 is not adjacent to and flush with an outer surface 112 of a lip 114 of the side panel 106 (no end panel is shown in FIGS. 1 and 2 to illustrate the gap 102 more clearly).

FIGS. 3 and 4 show a gap 118 at a three panel join of a second canopy which is in an assembled condition, with a roof panel 120 connected to a side panel 122 and an end panel 126. FIG. 3 illustrates the canopy from the inside while FIG. 4 illustrates the canopy from the outside. The gap 118 is formed as a result of the design as explained with reference to FIGS. 1 and 2 above. It will be appreciated that the gaps 102 and 118 may allow water to enter the canopy.

In an attempt to address this issue, sealant, e.g. silicone sealant, can be applied at the three panel joins after assembly of the vehicle canopy. However, this is undesirable as the kit is preferably provided to a customer in flat pack form and it may be difficult for and/or undesirable to have a customer carry out the sealing step. If the sealant is not applied properly, gaps will still be present at the three panel joins, resulting in possible leaks. Furthermore, this additional step adds to the cost associated with the product and unwanted time is spent on sealing the canopy.

The present invention aims to address or alleviate the issue described above, at least to some extent.

SUMMARY OF THE INVENTION

In accordance with a first aspect of the invention, there is provided a panel joining arrangement for a vehicle canopy, the canopy including at least one three panel join, wherein the panel joining arrangement comprises first and second lip portions formed in a side panel of the canopy, the first and second lip portions being longitudinally offset and transversely overlapping in relation to a length of the side panel, the panel joining arrangement further comprising a third lip portion formed in a roof panel of the canopy, wherein the third lip portion is configured to mate with the second lip portion at the three panel join of the canopy such that the third lip portion is located adjacent to and substantially flush with the first lip portion.

The third lip portion may be located in abutment with the first lip portion.

The arrangement may be configured such that, in an assembled condition of the canopy, an outer surface of the first lip portion is substantially flush with and laterally adjacent to an outer surface of the third lip portion. The arrangement may further be configured such that, in the assembled condition, an outer surface of the second lip portion, or at least a substantial part thereof, directly faces an inner surface of the third lip portion.

The arrangement may further include a sealing material which, in the assembled condition, is located between the outer surface of the second lip portion and the inner surface of the third lip portion. The sealing material may be sealing foam tape applied to an interior of the roof panel.

The arrangement may further include a fourth lip portion formed in an end panel of the canopy and configured to mate with at least the third lip portion at the three panel join. The fourth lip portion preferably also mates with the first lip portion adjacent to the three panel join. The end panel is preferably a front panel or a rear panel of the canopy.

The lip portions referred to above may be formed by or may form part of bends in the side panel, roof panel or end panel of the canopy, as the case may be. The bends may be 90 degree bends or near 90 degree bends.

In some embodiment, the third lip portion is defined by a return bend of the roof panel.

The first lip portion may be located at an end of the side panel and the second lip portion may located inwardly (e.g. slightly inwardly relative to the first lip portion) along the length of the side panel, thereby to define a space for receiving the third lip portion in the assembled condition of the vehicle canopy.

In accordance with a second aspect of the invention, there is provided a kit for a canopy to be fitted to a vehicle, the kit including a panel joining arrangement as described above. The kit may be a CKD.

In accordance with a third aspect of the invention, there is provided a vehicle canopy which includes at least a side panel and a roof panel engaging with an end panel at a three panel join of the canopy, wherein first and second lip portions are formed in the side panel, the first and second lip portions being longitudinally offset and transversely overlapping in relation to a length of the canopy, wherein a third lip portion is formed in the roof panel, the third lip portion mating with the second lip portion at the three panel join such that the third lip portion is located adjacent to and substantially flush with the first lip portion.

As mentioned above, a fourth lip portion may be formed in the end panel and may mate with at least the third lip portion at the three panel join.

In accordance with a fourth aspect of the invention, there is provided a vehicle canopy including four three panel joins and a panel joining arrangement substantially as described above associated with each of the three panel joins.

The canopy may be fitted to any suitable vehicle, such as a motor vehicle (e.g. a bakkie), a caravan and/or a trailer.

BRIEF DESCRIPTION OF THE DRAWINGS

The invention will now be further described, by way of example, with reference to the accompanying drawings.

In the drawings.

DETAILED DESCRIPTION WITH REFERENCE TO THE DRAWINGS

The following description of the invention is provided as an enabling teaching of the invention, is illustrative of the principles of the invention and is not intended to limit the scope of the invention. It will be understood that changes can be made to the embodiment/s described and depicted, while still attaining beneficial results of the present invention. Furthermore, it will be understood that some benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention.

Figure 1:
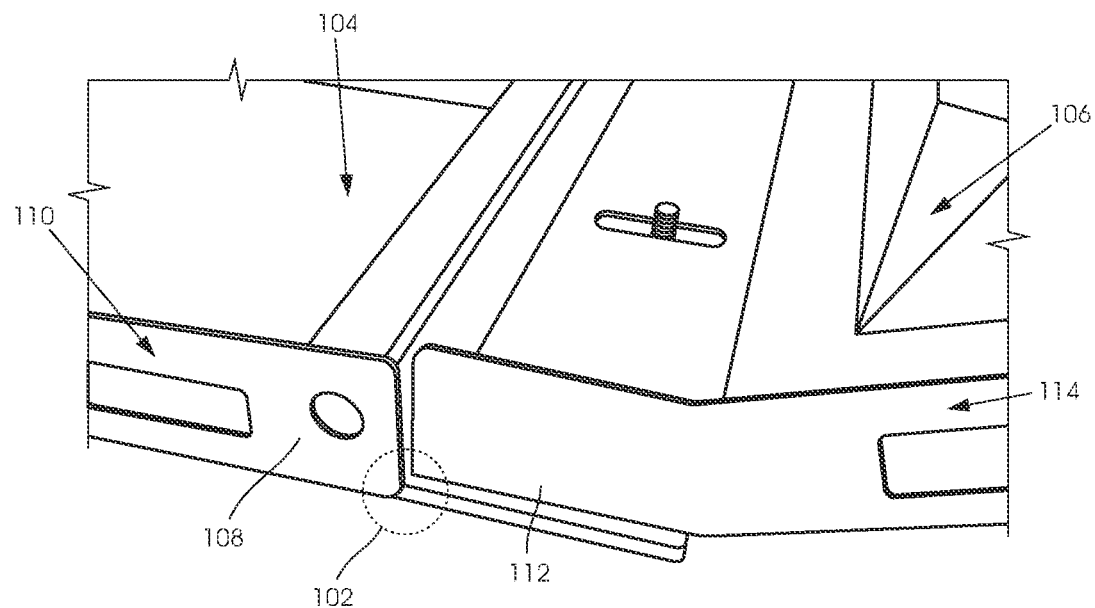
FIG. 1 is a three-dimensional view of an example of a gap formed at a three panel join of a known vehicle canopy.
Figure 2:
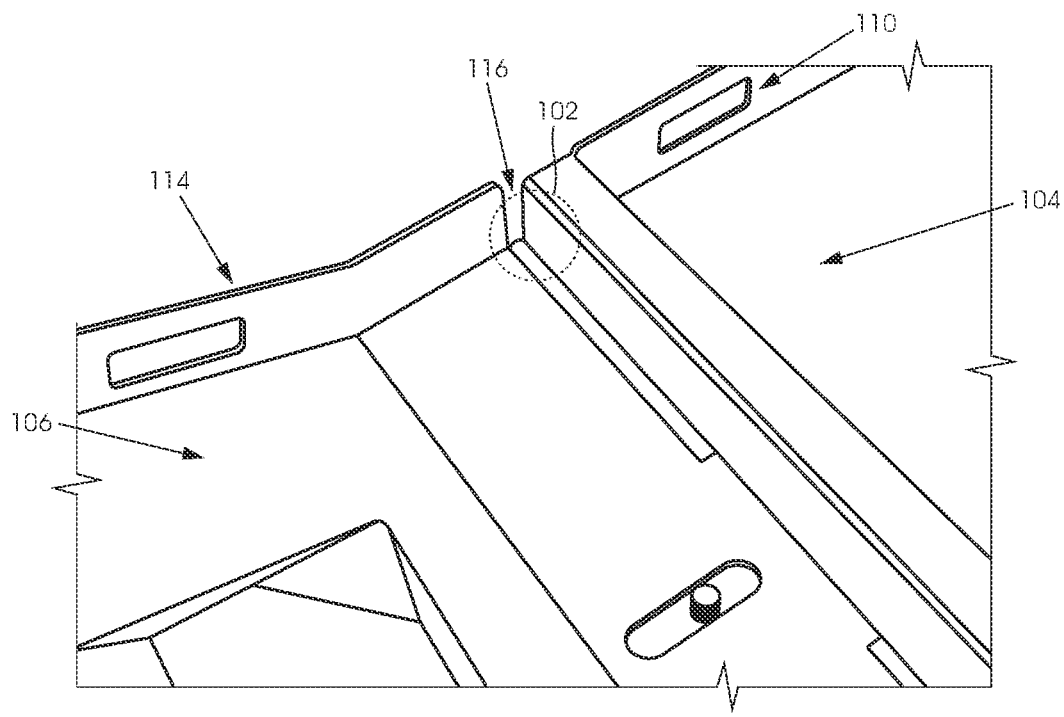
FIG. 2 is another three-dimensional view of the gap formed at the three panel join of the vehicle canopy of FIG. 1.
Figure 3:
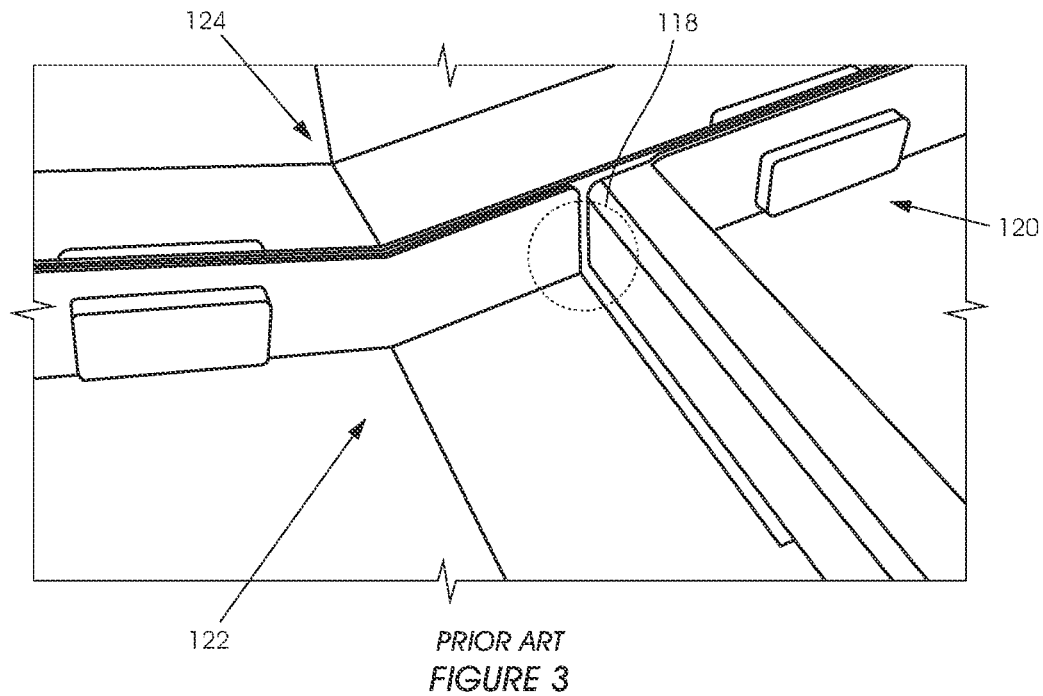
FIG. 3 is a three-dimensional view illustrating an example of a gap formed at a three panel join of another known vehicle canopy.
Figure 4:
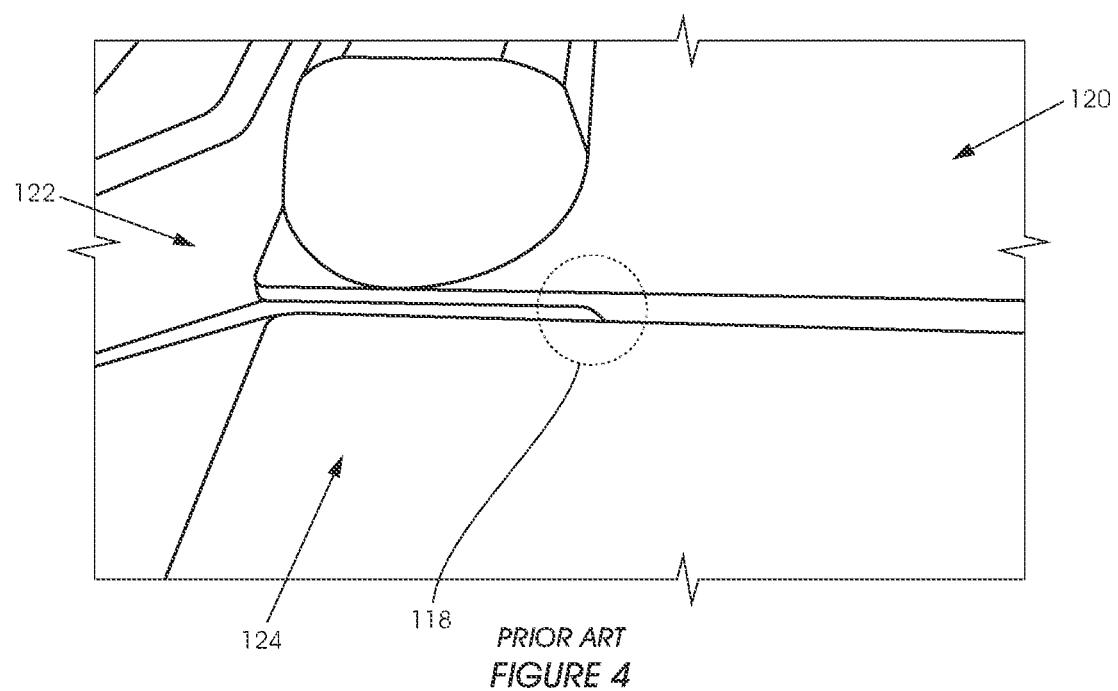
FIG. 4 is another three-dimensional view illustrating the gap formed at the three panel join of the vehicle canopy of FIG. 3.
Figure 5:
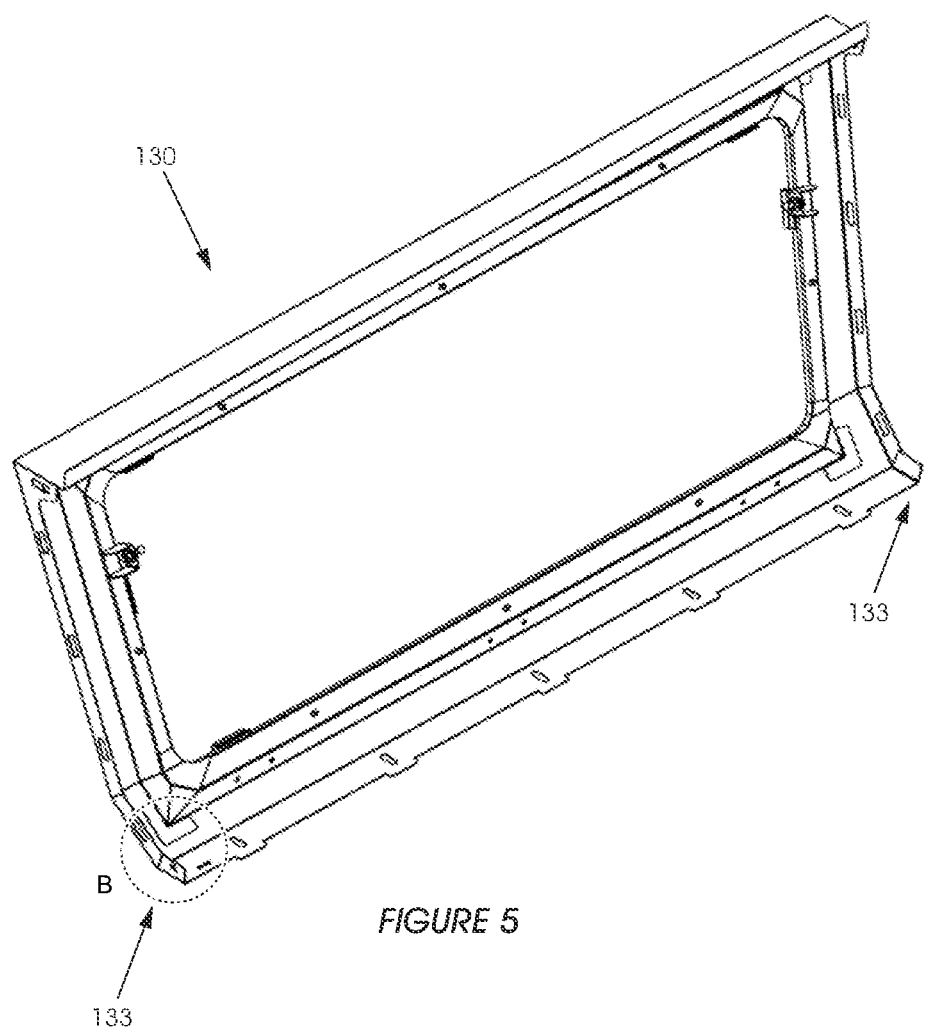
FIG. 5 is a three-dimensional view of an embodiment of a side panel for a canopy, shown in an upside down orientation and showing an interior/inside of the side panel, wherein the side panel includes parts of a panel joining arrangement according to the invention.
Figure 6:
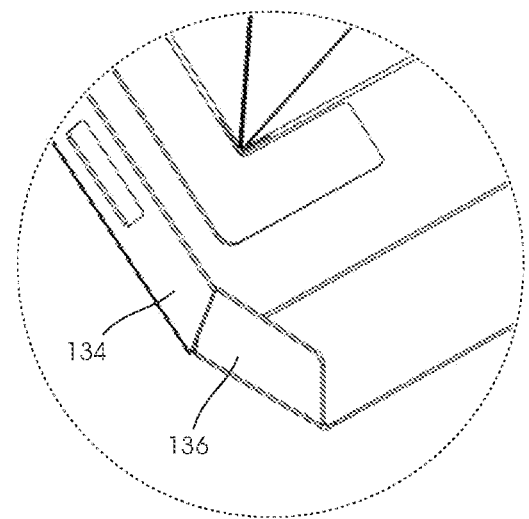
FIG. 6 is an enlarged view of zone "B" in FIG. 5.
Figure 7:
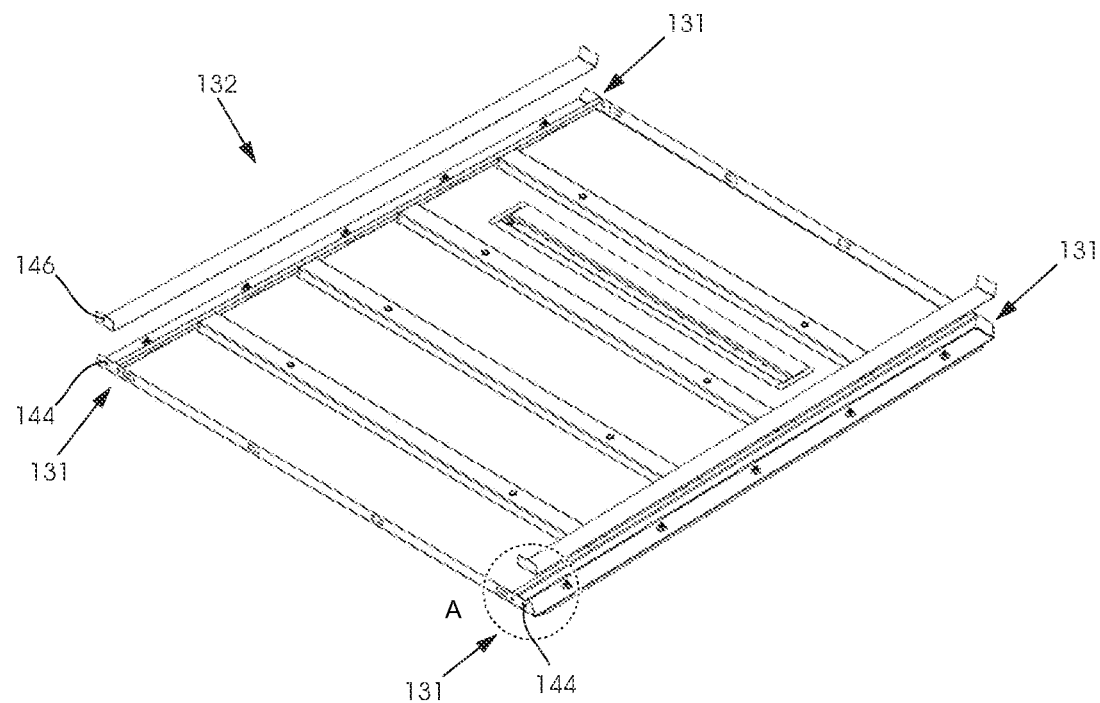
FIG. 7 is a three-dimensional, partially exploded view of an embodiment of a roof panel for a canopy, showing an interior/inside of the roof panel, wherein the roof panel includes part of a panel joining arrangement according to the invention.
Figure 8:
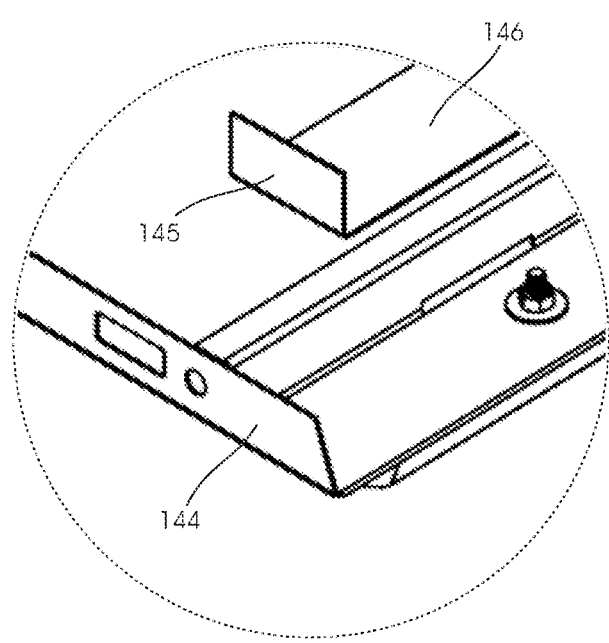
FIG. 8 is an enlarged view of zone "A" in FIG. 7.

FIGS. 5 to 8 illustrate an example embodiment of a panel joining arrangement according to the invention. FIGS. 5 and 6 illustrate a side panel 130 and FIGS. 7 and 8 illustrate a roof panel 132.

It should be understood that the side panel 130 and roof panel 132 may form part of a kit for a canopy for a vehicle, typically comprising a further side panel, a front panel and a rear panel (and/or other panels such as a junction panel), shaped to be flat packed and assembled. Each panel includes a lip which is complementally shaped to engage the lip of at least one other panel. To assemble the canopy, the lips of adjacent panels are located in abutment and are then secured together. The kit may include the necessary attachment means to attach various panels to each other and to the vehicle (not shown, but for instance as described in PCT/IB2015/057124, published as WO/2016/042494).

As described above, when assembled, the roof panel 132 will meet with respective side panels and end panels at four "three panel joins" or "three panel corner joins". Therefore, a three panel join will be defined at each of the four operatively upper corners 131 of the roof panel 132, as well as at two operatively upper corners 133 of the side panel 130.

The side panel 130 has a pair of first and second lip portions 134, 136 at each end thereof, located in the corners 133 referred to above. By way of example, the lip portions 134, 136 in the zone "B" in FIGS. 5 and 6 will be described below.

Figure 9:
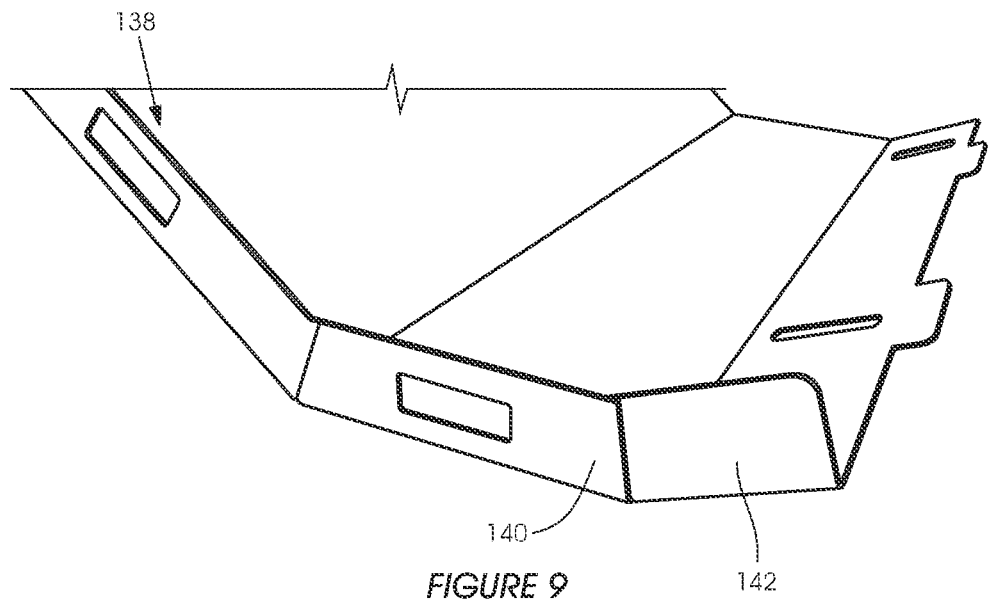
FIGS. 9 and 10 are three-dimensional views illustrating a prototype of a side panel with lip portions according an embodiment of to the invention.
Figure 10:
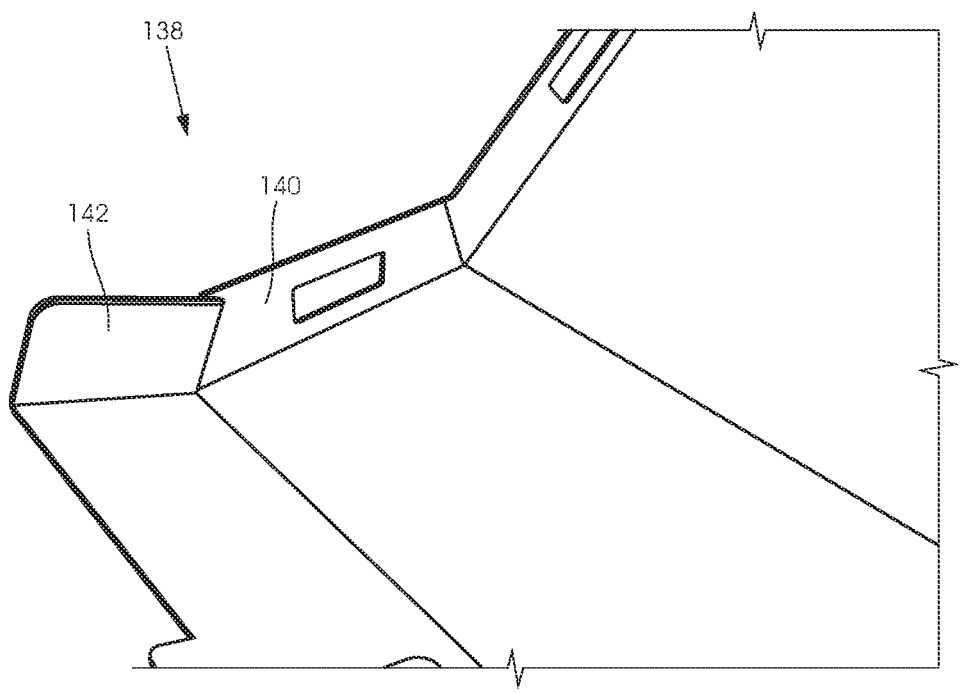

The first lip portion 134 and the second lip portion 136 are separate 90 degree bends at an end of the side panel 130. The lip portions 134, 136 may be bent stainless steel portions. The lip portions 134 are longitudinally offset and transversely overlapping. In other words, when the side panel 130 is viewed from the side, the lip portions 134, 136 are slightly spaced apart, and when the side panel 130 is viewed from the end or in cross-section, the lip portions 134, 136 overlap. These aspects are also clearly shown in FIGS. 9 and 10, which illustrate a prototype of the side panel 138 which includes the offset and overlapping first lip portion 140 and second lip portion 142.

Referring in greater detail to FIGS. 7 and 8, the roof panel 132 has a continuous 90 degree bend at each end thereof (this may be referred to as the "return bend" of the roof panel 132), defining a third lip portion 144 at each of the corners 131 of the roof panel 132. A sealing material in the form of sealing foam tape 146 is applied to the interior of the roof panel 132, at opposite sides thereof, extending along the length of the roof panel 132. The sealing foam tape 146 is shown in an "exploded" manner in FIGS. 7 and 8 to illustrate the components of the roof panel 132 more clearly. As is evident from FIG. 8 in particular, the sealing foam tape 146 has a bend 145 at each of its end regions, corresponding to the bend defining the third lip portion 144 for conforming to the shape of the third lip portion 144 when the canopy is assembled.

Each third lip portion 144 is configured to mate with a corresponding second lip portion 136 such that the third lip portion 144 is located adjacent to and substantially flush with a corresponding first lip portion 134. The design and advantages of this configuration will be described in greater detail with reference to the examples in FIGS. 11 to 18 below.

Figure 11:
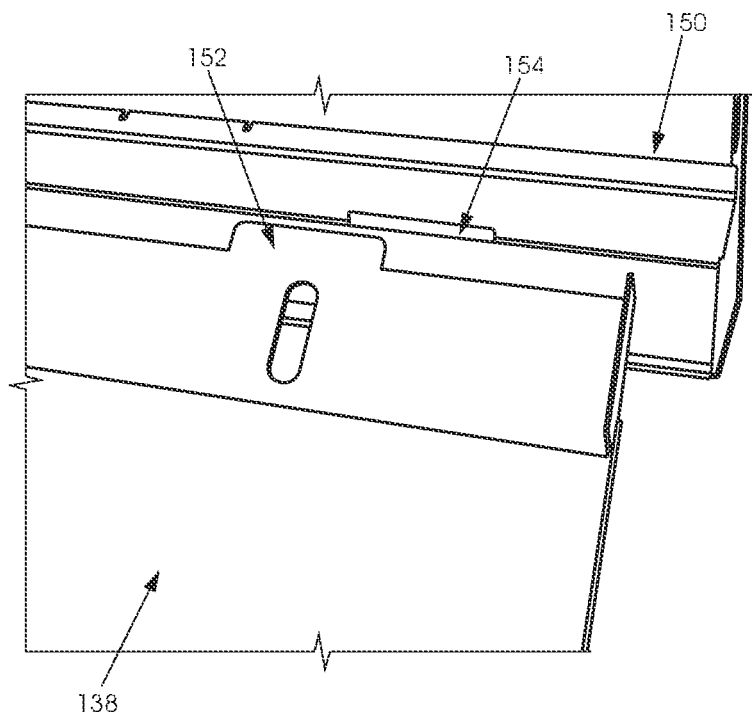
FIGS. 11 to 13 are three-dimensional views of an embodiment illustrating the manner in which side and roof panels can be joined according to the invention.
Figure 12:
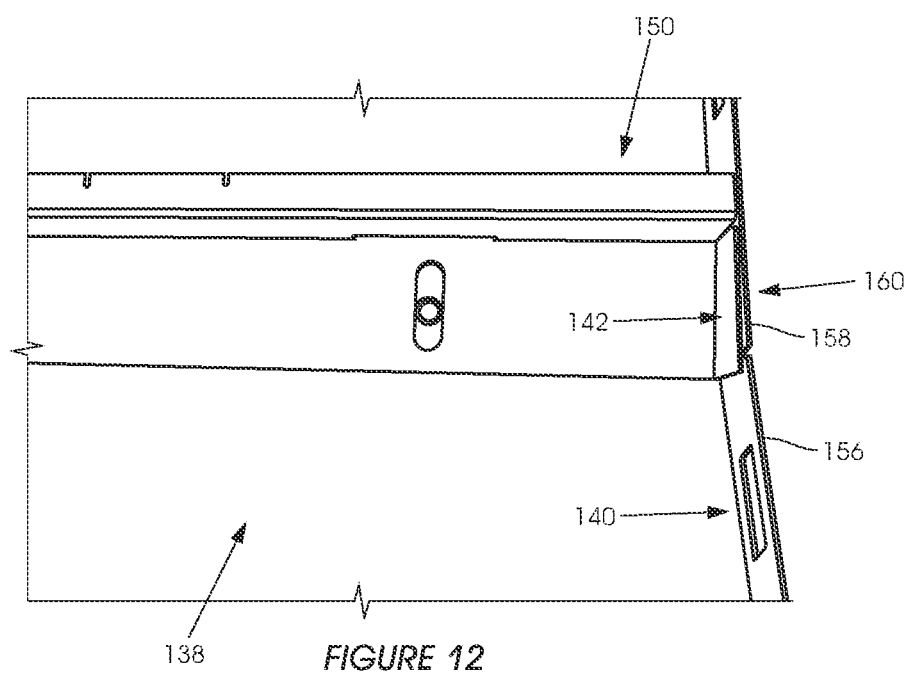
Figure 13:
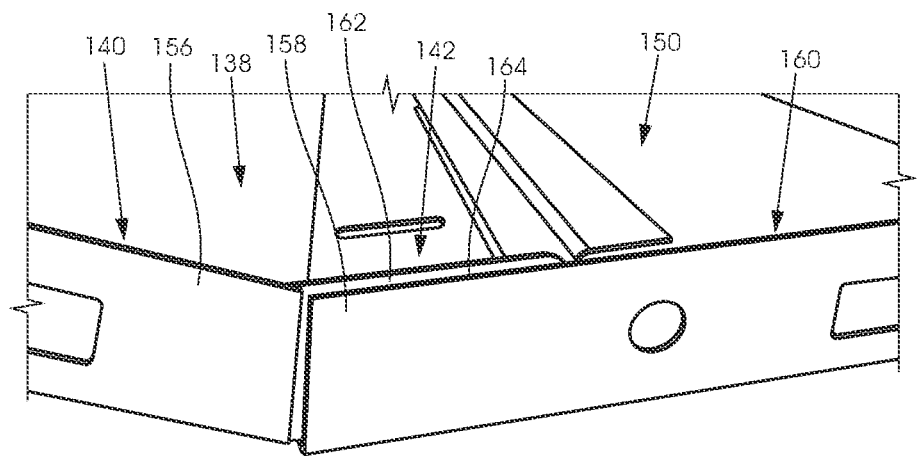

Referring to FIGS. 11 to 13, the side panel 138 mates with the roof panel 150 by means of complementally shaped spigots 152 and sockets 154 and the panels 138, 150 are secured to each other by suitable fasteners (not shown in FIGS. 11 to 13, but visible in FIG. 7). The spigots 152 are located on a bent surface of the side panel 138. This bent surface is connected to the bend which forms the second lip portion 142 and the second lip portion 142 extends at a 90 degree angle relative to the bent surface. The bent surface of the side panel 138 is positioned on a complemental surface of the roof panel 150 and adjacent to an operatively vertical section of the roof panel 150, which defines the sockets 154, when the spigots 152 are inserted into the sockets 154.

When in the mating condition (see FIGS. 12 and 13; FIG. 11 shows a disassembled condition), an outer surface 156 of the first lip portion is substantially flush with and laterally adjacent to an outer surface 158 of the third lip portion 160 on the roof panel 150. Furthermore, an outer surface 162 of the second lip portion directly faces an inner surface 164 of the third lip portion 160. This design ensures that the gap in the three panel join area of the canopies, as described in the "Background" section above and shown in FIGS. 1 to 4, is substantially obviated.

Figure 14:
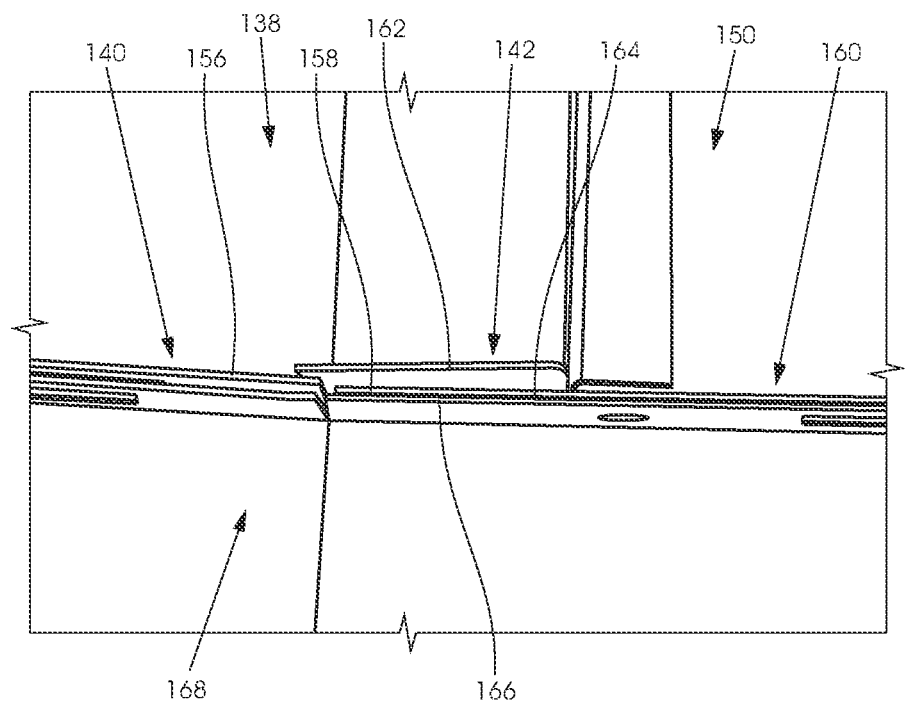
FIGS. 14 to 16 are three-dimensional views of an embodiment illustrating the manner in which side, roof and end panels can be joined according to the invention.
Figure 15:
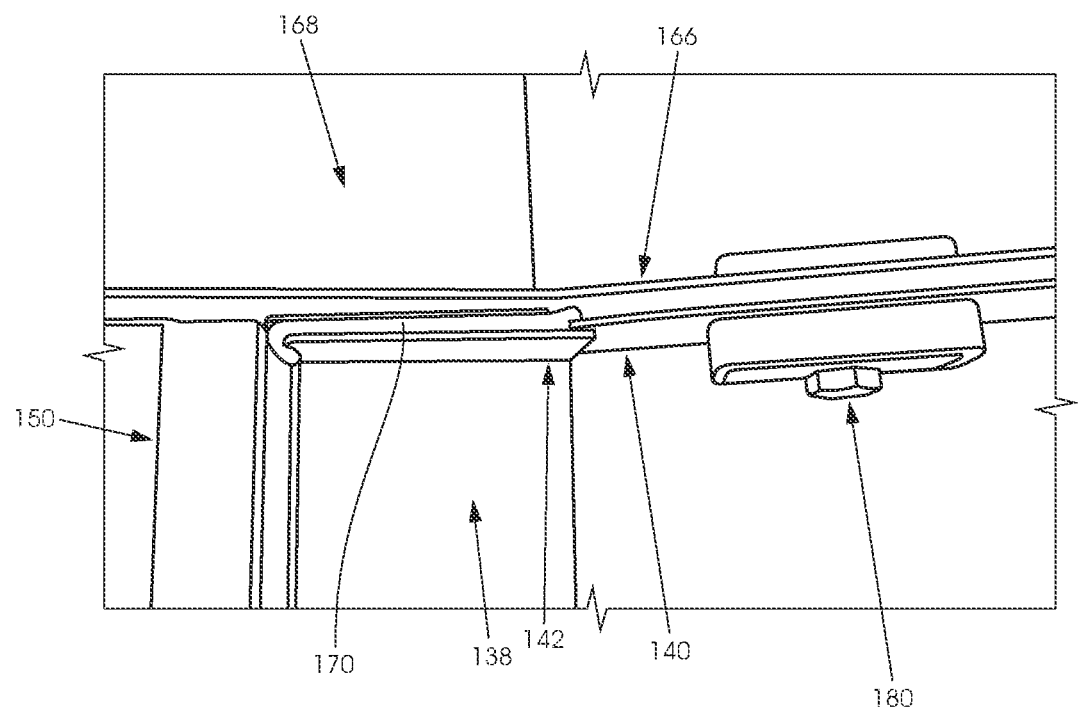

FIGS. 14 and 15 also show a fourth lip portion 166 defined by a bend in the end panel 168 (e.g. front or rear) which engages with the side panel 138 and roof panel 150 at the three panel join. As is clear from FIG. 15, the fourth lip portion 166 mates with both the first lip portion 140 and the third lip portion 160 and is directly secured to the first lip portion 140 by a suitable fastener 180. In other words, a face of the fourth lip portion 166 faces the outer surfaces of the first lip portion 140 and the third lip portion 160.

Figure 16:
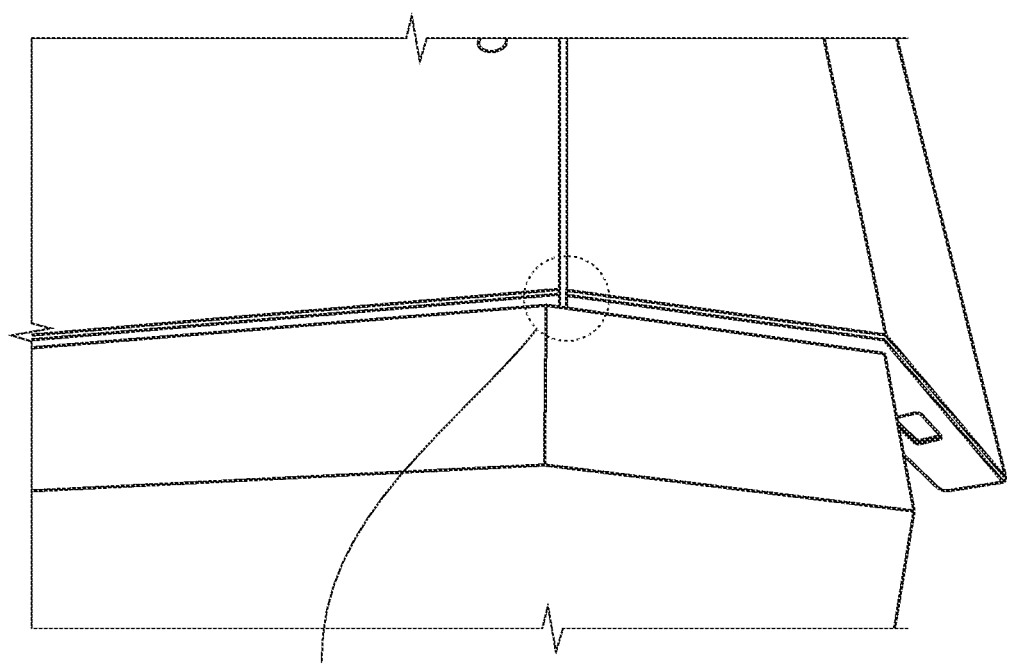

The Applicant has found that the first lip portion 140 and third lip portion 160 need not be exactly flush: at least a near flush arrangement in combination with the overlapping feature has been found to be effective in reducing or preventing leaks. FIG. 16 shows an example of the three panel corner join 172 from the outside, i.e. the part of the canopy that will be exposed to the elements in use.

FIG. 15 also shows the portion of the sealing foam tape 170 which is located between the outer surface 162 of the second lip portion 142 and the inner surface 164 of the third lip portion 160. This portion corresponds to the bend in the sealing foam tape 146 described with reference to FIGS. 7 and 8.

Figure 17:
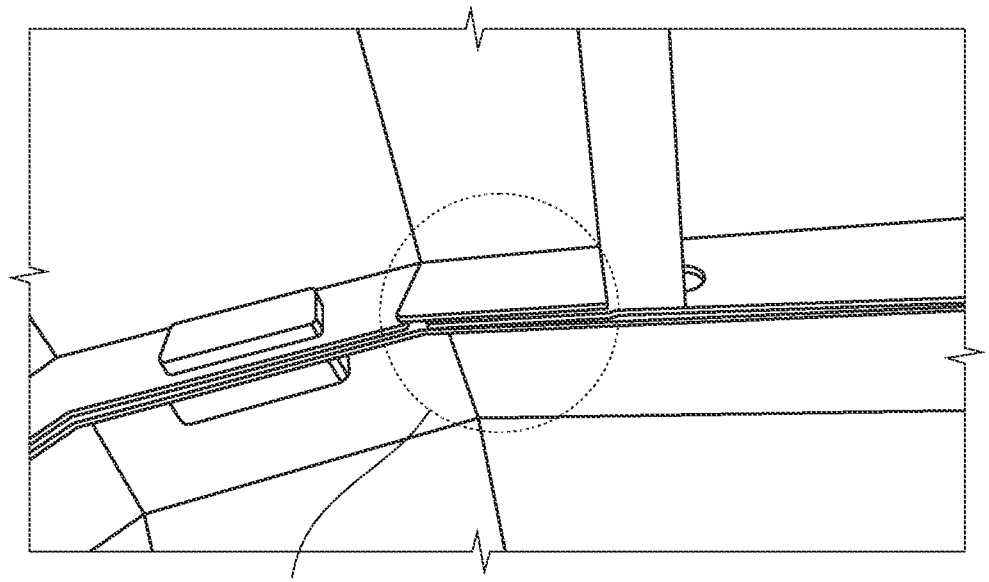
FIGS. 17 and 18 are three-dimensional views illustrating an interior/inside and an exterior/outside of an example of a canopy which includes a panel joining arrangement according to the invention.
Figure 18:
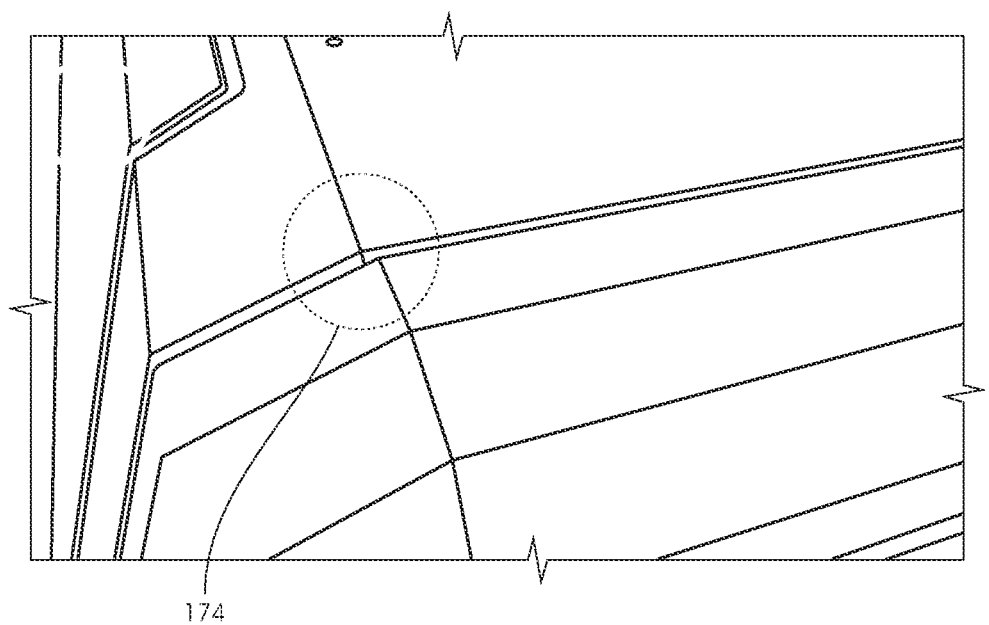
Figure 19:
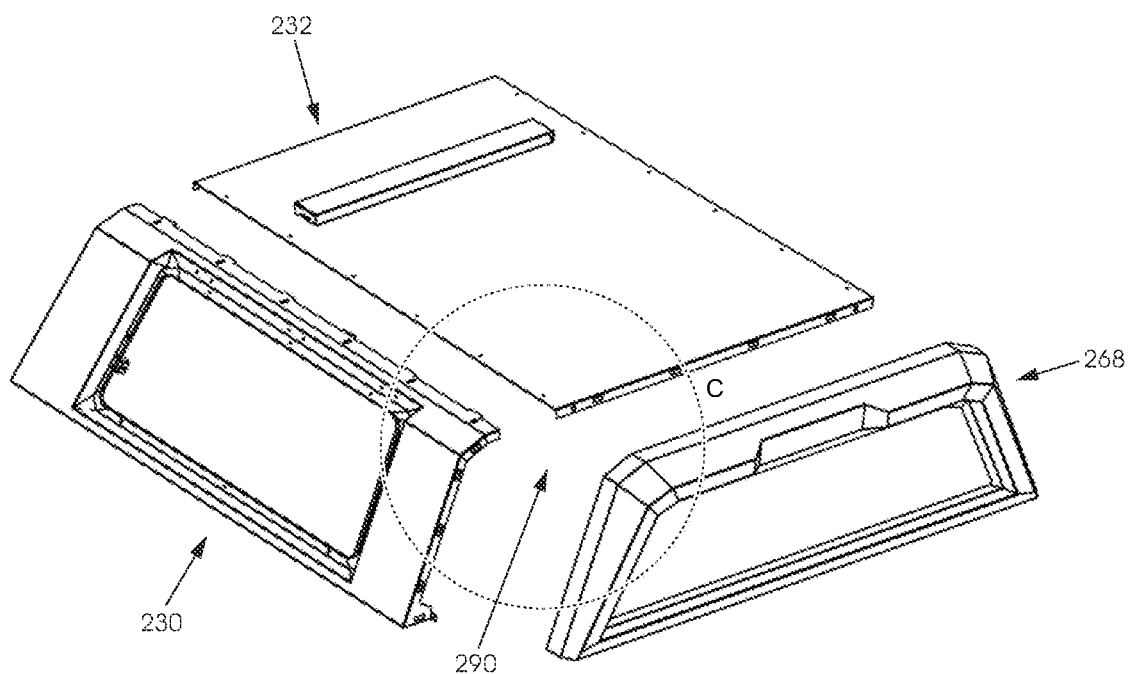
FIG. 19 is a three-dimensional exploded view of a side panel, a roof panel and an end panel of a canopy including an embodiment of a panel joining arrangement according to the invention.
Figure 20:
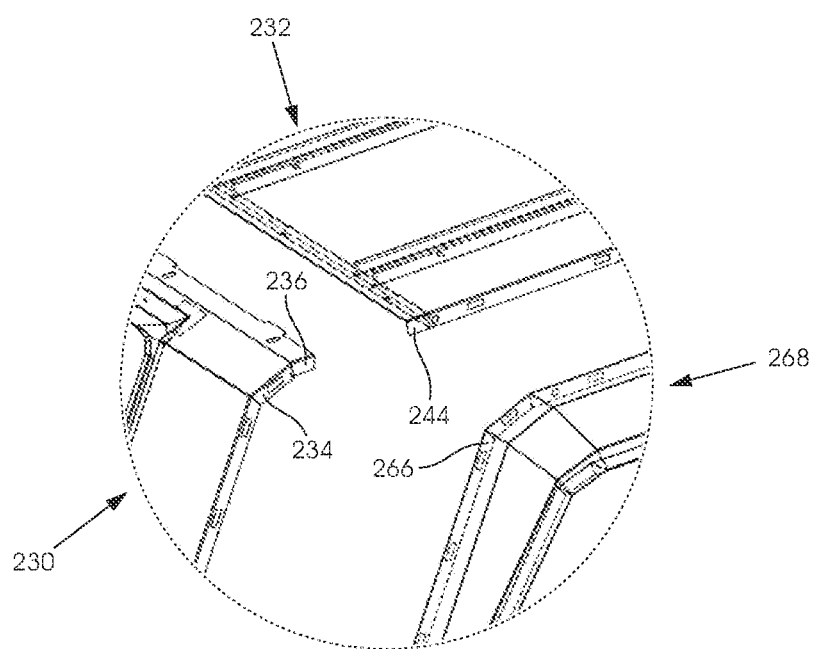
FIG. 20 is an enlarged view of zone "C" in FIG. 19, including hidden detail.

By way of further example, FIGS. 17 and 18 show parts of the interior and exterior, respectively, of an assembled vehicle canopy incorporating the panel joining arrangement described above at a three panel join 174.

Another embodiment of the panel joining arrangement is shown in FIGS. 19 to 22. These Figures illustrate a side panel 230, a roof panel 232 and an end panel 268 (in this case the end panel 268 is a rear panel that is positioned adjacent to or against a vehicle cab, in use).

It should be understood that the side panel 230, roof panel 232 and end panel 268 may form part of a kit for a canopy for a vehicle, typically comprising a further side panel and a front panel (and/or other panels such as a junction panel), shaped to be flat packed and assembled. Each panel includes a lip which is complementally shaped to engage the lip of at least one other panel. To assemble the canopy, the lips of adjacent panels are located in abutment and are then secured together. The kit may include the necessary attachment means to attach various panels to each other and to the vehicle (not shown, but for instance as described in PCT/IB2015/057124, published as WO/2016/042494).

Figure 21:
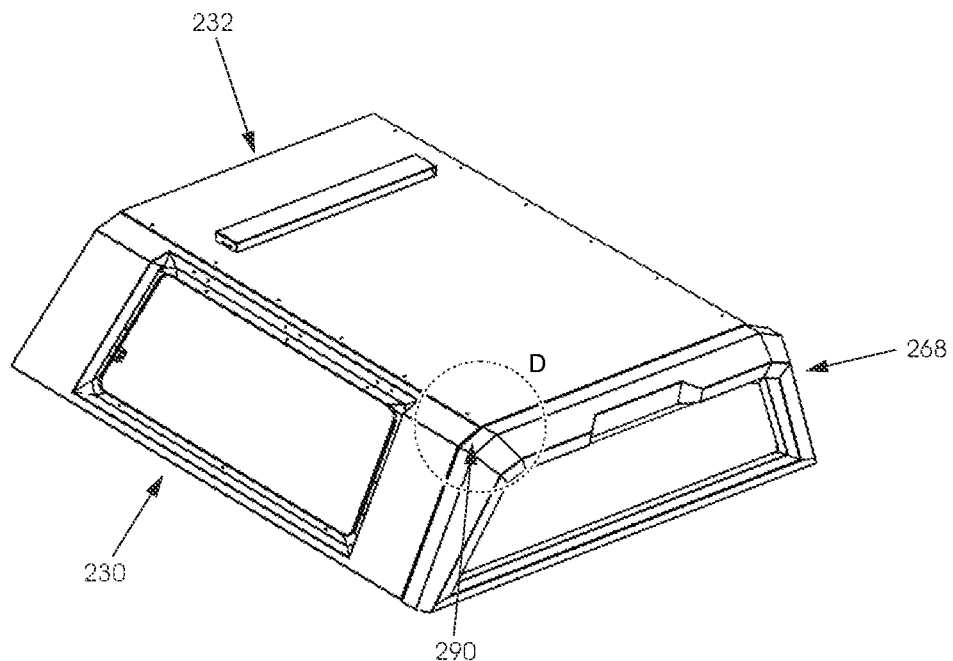
FIG. 21 is a three-dimensional view of the side panel, roof panel and end panel of FIG. 19 in an assembled condition.
Figure 22:
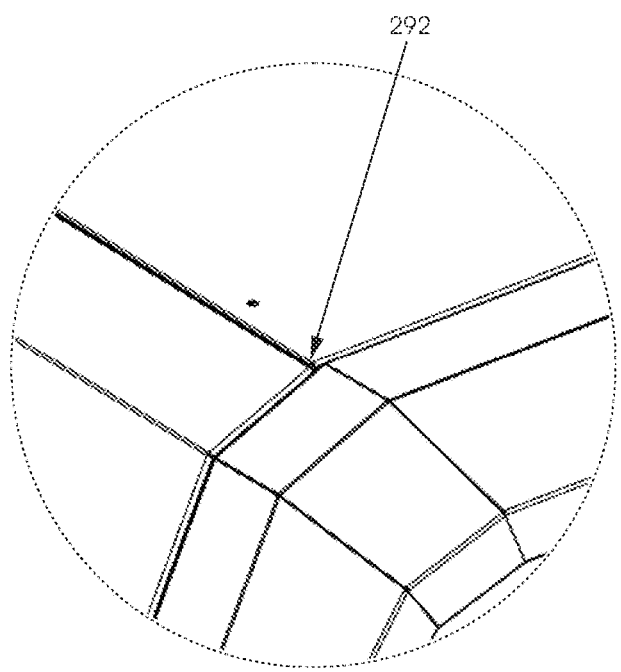
FIG. 22 is an enlarged view of zone "D" in FIG. 21.

As described above, when assembled, the roof panel 232 engages with respective side panels and end panels at four "three panel joins", one of which is located in the zone "D" of FIGS. 21 and 22 and its location is indicated by reference numeral 290. The arrangement at this specific zone is described below to illustrate certain aspects of the invention.

The side panel 230 has a pair of first and second lip portions 234, 236 at each end thereof, located in the operatively upper corner zones referred to above. By way of example, the lip portions 234, 236 in the zone "C" in FIG. 20 will be described below.

The first lip portion 234 and the second lip portion 236 are separate 90 degree bends at an end of the side panel 230. The lip portions 234, 236 may be bent stainless steel portions. The lip portions 234 are longitudinally offset and transversely overlapping. In other words, when the side panel 230 is viewed from the side, the lip portions 234, 236 are slightly spaced apart, and when the side panel 230 is viewed from the end, the lip portions 234, 236 overlap, as is clear from the hidden detail in FIG. 20. The first lip portion 234 is located at the end of the side panel 230 while the second lip portion 236 is spaced slightly inwardly along the length of the side panel 230 to define a space for receiving a third lip portion on the roof panel 232 as will be described below.

The roof panel 232 has a continuous 90 degree bend at each end thereof (this may be referred to as the "return bend" of the roof panel 232), defining a third lip portion 244 at each of the four corners of the roof panel 232. A sealing material may be applied to the interior of the roof panel 232 as described with reference to FIGS. 7 and 8 above and its shape may conform to that of the third lip portion 244 when the canopy is assembled. The sealing material may be located between the third lip portion 244 and the second lip portion 236 in the assembled condition.

Each third lip portion 244 is configured to mate with a corresponding second lip portion 236 such that the third lip portion 244 is located adjacent to and substantially flush with a corresponding first lip portion 234. In other words, when the canopy is assembled, the third lip portion 244 slides behind (i.e. over the outer face) of the second lip portion 236 and the third lip portion 244 becomes oriented substantially parallel to the first lip portion 234.

The side panel 230 and the roof panel 232 are connected by complemental mating formations and fasteners as already described above. When in the mating/assembled condition, an outer surface of the first lip portion 234 (the surface shown in FIG. 20) is substantially flush with and laterally adjacent to an outer surface (the surface shown in FIG. 20) of the third lip portion 244 on the roof panel 232.

An outer surface of the second lip portion 236 (the surface shown in FIG. 20) directly faces an inner surface of the third lip portion 244 in the assembled condition. This design ensures that the gap in the three panel join area of the canopies, as described in the "Background" section above and shown in FIGS. 1 to 4, is substantially obviated, reducing or preventing leakage especially through the area 292 indicated in FIG. 22.

A fourth lip portion 266 defined by a 90 degree bend in an upper region of the end panel 268 which engages with the side panel 230 and roof panel 232 at the three panel join. As is clear from FIG. 20, the fourth lip portion 266 is configured to mate with both the first lip portion 234 and the third lip portion 244, e.g. the face of the end panel 268 which defines the fourth lip portion 266 can be clipped to both the first lip portion 234 on the side panel 230 and the third lip portion 266 on the roof panel 232 using suitable fasteners. The outer face of the fourth lip portion 266 then faces the outer surfaces of the first lip portion 234 and the third lip portion 244 when the parts are assembled as shown in FIGS. 21 and 22.

The Applicant believes that the panel joining arrangement described herein will prevent or at least reduce water leaks and possibly other unwanted particle ingress at the three panel joins of CKD vehicle canopies. Leaks may be prevented or reduced by the extension of the "return bend" on the roof panel up to the ends of the roof panel, and by providing offset and overlapping bend lips on the side panel which mate with the roof panel. The end panels then mate snugly with the roof and side panels to define an enhanced three panel join.

The addition of sealing tape to this arrangement may assist in sealing along the adjoining edge between the roof panel and side panel components. This may obviate the need for a customer or end user to apply additional sealant. It may also reduce the costs associated with the product and reduce time required to seal the canopy.

The invention claimed is:

1. A panel joining arrangement for a vehicle canopy, the vehicle canopy including at least one multiple panel join, wherein the panel joining arrangement comprises first and second lip portions formed in a first panel of the vehicle canopy, the first and second lip portions being longitudinally offset and transversely overlapping in relation to a length of the first panel, the panel joining arrangement further comprising a third lip portion formed in a second panel of the vehicle canopy, wherein the third lip portion is configured to mate with the second lip portion at the multiple panel join of the vehicle canopy.

2. The panel joining arrangement according to claim 1 which is configured such that, in an assembled condition of the vehicle canopy, an outer surface of the first lip portion is substantially flush with and laterally adjacent to an outer surface of the third lip portion.

3. The panel joining arrangement according to claim 2 which is further configured such that, in the assembled condition of the vehicle canopy, an outer surface of the second lip portion, or at least a part thereof, directly faces an inner surface of the third lip portion.

4. The panel joining arrangement according to claim 3 which further includes a sealing material which, in the assembled condition, is located between the outer surface of the second lip portion and the inner surface of the third lip portion.

5. The panel joining arrangement according to claim 4, wherein the sealing material is sealing foam tape applied to an interior of the second panel.

6. The panel joining arrangement according to claim 1 which further includes a fourth lip portion formed in a third panel of the vehicle canopy and configured to mate with at least the third lip portion at the multiple panel join.

7. The panel joining arrangement according to claim 6, wherein the fourth lip portion is configured also to mate with the first lip portion.

8. The panel joining arrangement according to claim 6, wherein the third panel defining the fourth lip portion is a front panel or a rear panel of the vehicle canopy.

9. The panel joining arrangement according to claim 1, wherein the first and second lip portions are formed by bends in the first panel and the third lip portion is formed by a bend in the second panel.

10. The panel joining arrangement according to claim 9, wherein the bends are 90 degree bends or near 90 degree bends.

11. The panel joining arrangement according to claim 1, wherein the third lip portion is defined by a return bend of the second panel, wherein the first lip portion is located at an end of the first panel and the second lip portion is located inwardly along the length of the first panel, thereby to define a space for receiving the third lip portion in an assembled condition of the vehicle canopy.

12. The panel joining arrangement according to claim 1, wherein the multiple panel join is a three panel join.

13. The panel joining arrangement according to claim 1, wherein the first panel is a side panel.

14. The panel joining arrangement according to claim 1, wherein the second panel is a roof panel.

15. A kit for a vehicle canopy, the kit including the panel joining arrangement according to claim 1.

16. A vehicle canopy which includes four multiple panel joins and the panel joining arrangement according to claim 1 associated with each of the four multiple panel joins.

17. A vehicle canopy which includes at least a first panel and a second panel engaging with a third panel at a three panel join of the vehicle canopy, wherein first and second lip portions are formed in the first panel, the first and second lip portions being longitudinally offset and transversely overlapping in relation to a length of the vehicle canopy, wherein a third lip portion is formed in the second panel, the third lip portion mating with the second lip portion at the three panel join.

18. The vehicle canopy according to claim 17, wherein a fourth lip portion is formed in the third panel and mates with at least the third lip portion at the three panel join.

19. The panel joining arrangement according to claim 17, wherein the first panel is a side panel.

20. The panel joining arrangement according to claim 17, wherein the second panel is a roof panel.

21. The panel joining arrangement according to claim 17, wherein the third panel is an end panel.

* * * * *